United States Patent
Feldtkeller

(10) Patent No.: US 6,515,874 B2
(45) Date of Patent: Feb. 4, 2003

(54) CLOCKED POWER SUPPLY

(75) Inventor: Martin Feldtkeller, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/122,521

(22) Filed: Apr. 11, 2002

(65) Prior Publication Data

US 2002/0136034 A1 Sep. 26, 2002

Related U.S. Application Data

(63) Continuation of application No. PCT/EP00/09961, filed on Oct. 10, 2000.

(30) Foreign Application Priority Data

Oct. 11, 1999 (DE) ........................................ 199 48 903

(51) Int. Cl.⁷ ............................................. H02M 3/335
(52) U.S. Cl. ................................ 363/21.01; 363/21.13
(58) Field of Search ............................. 363/20, 21.01, 363/21.02, 21.04, 21.12, 21.13

(56) References Cited

U.S. PATENT DOCUMENTS

| 4,276,586 A | * | 6/1981 | Boekhorst ................. 363/21.12 |
| 5,347,168 A |   | 9/1994 | Russo |
| 5,355,301 A |   | 10/1994 | Saito et al. |
| 5,619,402 A | * | 4/1997 | Liu ............................... 363/20 |
| 5,757,625 A |   | 5/1998 | Schoofs |
| 6,344,980 B1 | * | 2/2002 | Hwang et al. ........... 363/21.01 |
| 6,381,151 B1 | * | 4/2002 | Jang ........................ 363/21.01 |
| 6,385,061 B1 | * | 5/2002 | Turchi et al. ............ 363/21.15 |

FOREIGN PATENT DOCUMENTS

| DE | 43 24 331 A1 | 1/1995 |
| JP | 10 290 566 A | 10/1998 |
| WO | WO 96/27232 | 9/1996 |

* cited by examiner

Primary Examiner—Adolf Deneke Berhane
(74) Attorney, Agent, or Firm—Laurence A. Greenberg; Werner H. Stemer; Ralph E. Locher

(57) ABSTRACT

The integrable control circuit drives a semiconductor switch in a switched-mode power supply. The control circuit has a control unit for producing control pulses for the semiconductor switch based on a variable oscillator signal. A duration of the individual control pulses depends on a first control signal and on a second control signal. In addition, a measurement system produces the second control signal in dependence on a load current of the semiconductor switch. A power regulation system that receives the oscillator signal produces a third control signal and supplies the signal to the control unit. The third control signal is inversely proportional to the square root of the oscillator frequency. In this way, it is possible for the power output of the switched-mode power supply to remain constant independent of the oscillator frequency.

8 Claims, 4 Drawing Sheets

CLOCKED POWER SUPPLY

CROSS-REFERENCE TO RELATED APPLICATION

This application is a continuation of copending International Application No. PCT/EP00/09961, filed Oct. 10, 2000, which designated the United States.

BACKGROUND OF THE INVENTION

FIELD OF THE INVENTION

The invention relates to a monolithically integratable circuit configuration for driving a semiconductor switch in a switched-mode power supply, having the following features:

- the circuit configuration has a first and a second supply potential terminal;
- a control unit for producing control pulses for the semiconductor switch according to a variable oscillator signal, whereby the duration of the individual control pulses depends on a first control signal and on a second control signal;
- a measurement system for producing the second control signal, which is dependent on the load current of the semiconductor switch.

Circuit configurations of this type are used to regulate the output voltage, or the output power, of a switched-mode power supply.

The power consumed or output by a switched-mode power supply is determined by, among other factors, the duration of the periodically produced control pulses that cause a closing of the semiconductor switch for the duration of the control pulses, thus causing a flow of the load current. The regulation of the duration of the control pulses, which are usually generated in sync with the oscillator signal, takes place in the circuit configuration dependent on a first and on a second control signal. The first control signal depends on, among other factors, the output voltage, or the output power, of the switched-mode power supply.

In the prior art circuit configurations, there thus takes place a closing of the semiconductor switch in time with the oscillator signal, whereby the semiconductor switch is opened again dependent on the course of the first and second control signal. The control pulses are usually selected such that they terminate when the first control signal is exceeded by the second control signal, through which the semiconductor switch is opened.

Switched-mode power supplies are used, among other things, for supplying power to monitors or television sets. So that electrical and magnetic scatter fields of the switched-mode power supply will not be able to cause disturbances of the picture, the switched-mode power supply is usually synchronized with the line frequency of the monitor. There exist a multiplicity of different standards and different screen resolutions. For this reason, a monitor must be able to be adapted to different line frequencies over a broad frequency range. As a lower limit, almost all monitors operate with a line frequency of 31.5 kHz, in order to ensure compatibility with the VGA standard in DOS mode.

In order to achieve a higher display screen resolution, as well as a higher vertical scanning frequency of the electron beam, higher line deflection frequencies must be used. With higher line deflection frequencies, the flickering of the monitor can be reduced. Currently, for 17" monitors, the upper limit of the line frequency is 85 kHz. For 21" monitors, this limit is 108 kHz. In the future, a further increase of the line deflection frequency is planned.

In order to be able to meet the requirements of the synchronization of the line frequency of the monitor with the oscillator frequency of the switched-mode power supply, the switched-mode power supply must operate over a broad frequency range, from 31.5 kHz up to approximately 120 kHz.

The power requirement of a monitor varies according to the size of the picture tube, between approximately 70 watts and 140 watts. For reasons of cost, as a rule a flyback converter is used. Due to the lower radiation of electromagnetic interference fields, the flyback converter is preferably operated in delta current operation. Here, the primary winding of the transformer is periodically connected with the rectified input voltage between the first and second supply potential terminal until the flow of current through the primary winding, starting from the value zero, has reached a value that depends on a control signal. Subsequently, the flow of current in the primary winding is interrupted, and the overall magnetically stored energy flows off to the load at the secondary side via rectifying diodes. The power emission of a synchronized flyback converter in delta current operation is dependent on the maximum current in the primary winding and on the frequency of the power supply, i.e., the line deflection frequency.

This has the consequence that at the highest line frequency, the switched-mode power supply in a monitor can emit a significantly higher power than at the lowest line deflection frequency. However, the actual power requirement of a monitor in fact hardly depends on the selected line deflection frequency.

If, in operation with a high line deflection frequency, a fault occurs in which there arises a considerable additional power loss, without a lowering of the output voltage of the switched-mode power supply and the possibility of detecting the error in this way, the monitor can cause a fire.

It is therefore known from the prior art to limit the emitted power of the switched-mode power supply by monitoring the secondary current in the secondary transformer winding and providing a feedback loop in order to control the semiconductor switch. In addition, it is known to control the primary current dependent on the line frequency. However, none of these solutions can be realized in monolithically integrated form. In addition, the power limitation operates in a relatively imprecise fashion.

SUMMARY OF THE INVENTION

It is accordingly an object of the invention to provide a clocked current supply, which overcomes the above-mentioned disadvantages of the heretofore-known devices and methods of this general type and which provides for a circuit configuration that can be monolithically integrated that prevents an excessive emission of power of the switched-mode power supply in all operating states, in order to prevent damage to the power supply, as well as to the additional components supplied by it. In addition, the power regulation is to take place with a high degree of precision.

With the foregoing and other objects in view there is provided, in accordance with the invention, a monolithically integratable control circuit for driving a semiconductor switch in a switched-mode power supply with a first and a second supply potential terminal, which comprises:

- a control unit for generating control pulses for the semiconductor switch based on an oscillator signal having a variable oscillator frequency, wherein a duration of individual drive pulses depends on a first control signal that is dependent on an output voltage of the switched-mode power supply, and on a second control signal;

a measurement system connected to said control unit for generating the second control signal in dependence on a load current of the semiconductor switch;

a power regulation system connected to said control unit, said power regulation system receiving the oscillator signal, generating a third control signal inversely proportional to a square root of the oscillator frequency, and supplying the third control signal to said control unit.

The invention is based on the knowledge that the power emission in delta current operation in a flyback converter increases as the square of the maximum current in the primary winding, and proportional to the frequency, i.e., to the line deflection frequency. The power regulation system provided in the switched-mode power supply has the effect that the maximum peak current in the primary winding is taken back in a manner inversely proportional to the square root of the frequency. The power regulation system therefore provides the control unit with a third control signal, which, dependent on the already-selected frequency, controls the semiconductor switch in such a way that the maximum peak current (load current) in the primary winding is influenced in a manner corresponding to the above-named relationship.

For this purpose, and in accordance with an added feature of the invention, the power regulation system has the following features:

a pulse generator that receives the oscillator signal;

a series circuit of a source of current and a charge storage unit, said circuit being situated between a third and a fourth supply potential terminal;

a series circuit of a MOS diode and a controllable switch, said circuit being connected in parallel to the charge storage unit;

the switch is controlled according to the pulse generator, whereby the pulse-duty ratio is dependent on the oscillator signal.

The third control signal is thereby picked off at the node between the current source, the charge storage unit, and the MOS diode.

The charge storage unit is charged with a constant current via the current source, and is periodically discharged for a fixed time interval via the MOS transistor wired as a diode. The period duration with which the switch is controlled thereby corresponds to the period duration of the switched-mode power supply. The difference of the capacitor voltage resulting on average and the inception voltage of the MOS diode yields a value that can be used to limit the primary peak current. This value represents the third control signal, which is supplied to the control unit. The advantage of this system is that the MOS diode has a current-voltage characteristic curve having a quadratic shape. The voltage that is connected via the MOS diode is consequently a square root function of the current flowing through it. Thus, the maximum peak current in the primary winding can be taken back in a manner inversely proportional to the square root of the frequency.

A further advantage of the invention is that the current source and the charge storage unit are already present in flyback converter switched-mode power supplies known from the prior art, since in this way what is known as a "soft start" is realized. The primary peak current is limited dependent on the voltage that is present at the charge storage unit. A flyback converter switched-mode power supply having a soft start is known for example from the textbook "Schaltnetzteile," by Hirschmann and Hauenstein, published by Siemens A G, 1990, pages 179–90.

In accordance with an advantageous construction, the control unit has a comparator to which the first control signal is supplied at a first inverting input, the second control signal is supplied at a second inverting input, and the third control signal, which is dependent on the load current of the semiconductor switch, is supplied at a non-inverting input.

Through this, it is possible to carry out a frequency-dependent power limitation. However, in the case of normal operation, the semiconductor switch is controlled via the first control signal, which represents a voltage signal picked off from the secondary side.

In accordance with a further advantageous construction, the power regulation system has a temperature compensation device that subtracts a predetermined value from the voltage at the node point and supplies it to the comparator as a third control signal. The voltage at which a current begins to flow according to the quadratic current-voltage characteristic of the MOS diode varies dependent on the ambient temperature. Due to the fact that the power regulation system has a temperature compensation device, this offset can be almost avoided.

For this purpose, the temperature compensation device has a semiconductor switch and a current source that is tied to the fourth supply voltage potential. The node point between the semiconductor switch and the current source is connected to the first inverting input of the comparator.

The semiconductor switch of the temperature compensation device has a performance that depends strongly on temperature, so that a value dependent on the temperature is subtracted from the voltage at the node point, and the offset is avoided.

In a further advantageous construction, means are provided in the pulse generator that compensate the temperature-dependent characteristic of the MOS diode of the power regulation system.

Just as the inception voltage of the MOS diode varies with temperature, the steepness of the current-voltage gradient also varies dependent thereon. The temperature compensation system of the pulse generator modifies the pulse-duty ratio of the switch of the power regulation system in a manner depending on the temperature. Through this, the precision of the power regulation of the overall switched-mode power supply can be considerably improved. The temperature compensation is noticeable above all when the ambient temperature has a value greater than 40° C.

In accordance with a concomitant feature of the invention, the pulse generator has a charge store to which a semiconductor switch controlled by the oscillator signal is connected in parallel, and to which a temperature-dependent semiconductor switch is connected downstream. The produced pulse duration is dependent on the duration, in order to charge the charge storage unit from the third supply potential to a first predetermined reference potential.

Other features which are considered as characteristic for the invention are set forth in the appended claims.

Although the invention is illustrated and described herein as embodied in a clocked power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
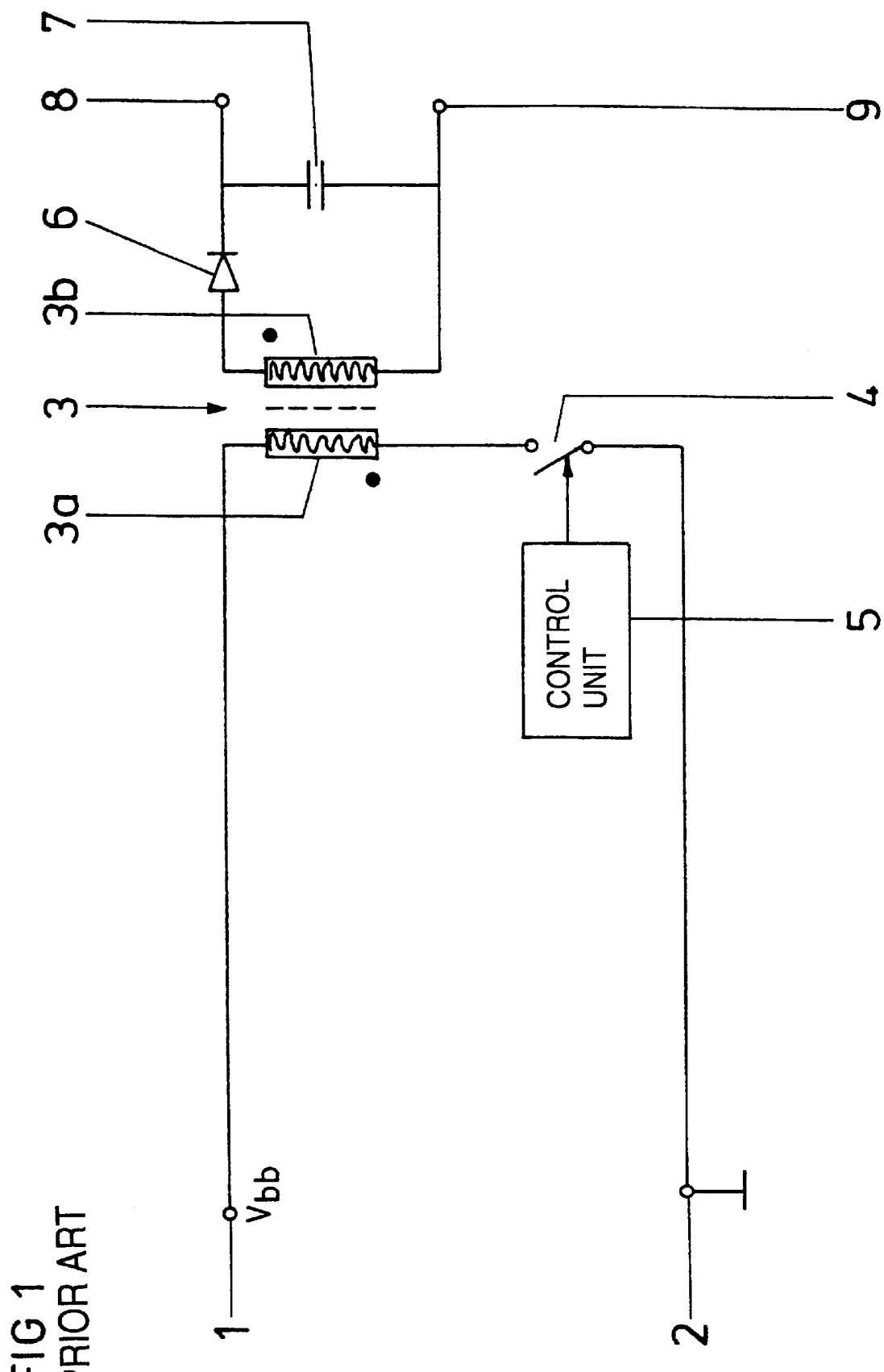
FIG. 1 is a circuit schematic of a prior art flyback converter switched-m ode power supply.

Referring now to the figures of the drawing in detail and first, particularly, to FIG. 1 thereof, there is shown a schematic design of a flyback converter switched-mode power supply. The series circuit of an inductive transformer 3 and a switch 4 is provided between a first supply potential terminal 1, which usually carries a high supply potential $V_{bb}$, and a second supply potential terminal 2 carrying a lower reference potential, such as ground potential. The transformer 3 has a primary coil 3a and a secondary coil 3b. The primary coil 3a is connected to the first supply potential terminal 1. The switch 4, which is for example realized as a semiconductor switch (MOSFET, bipolar transistor, etc.), is switched conductive and blocking via a control unit 5. The control unit 5 usually has a pulse-width modulator, whereby the opening and closing of the switch 4 takes place in the clock of an oscillator signal. The secondary coil 3b is connected with its first terminal to a first output terminal 8 via a diode 6, and is connected with its second terminal to a second output terminal 9. In addition, a charge store 7 in the form of a capacitor is provided between the first and second output terminals 8, 9.

Figure 2:
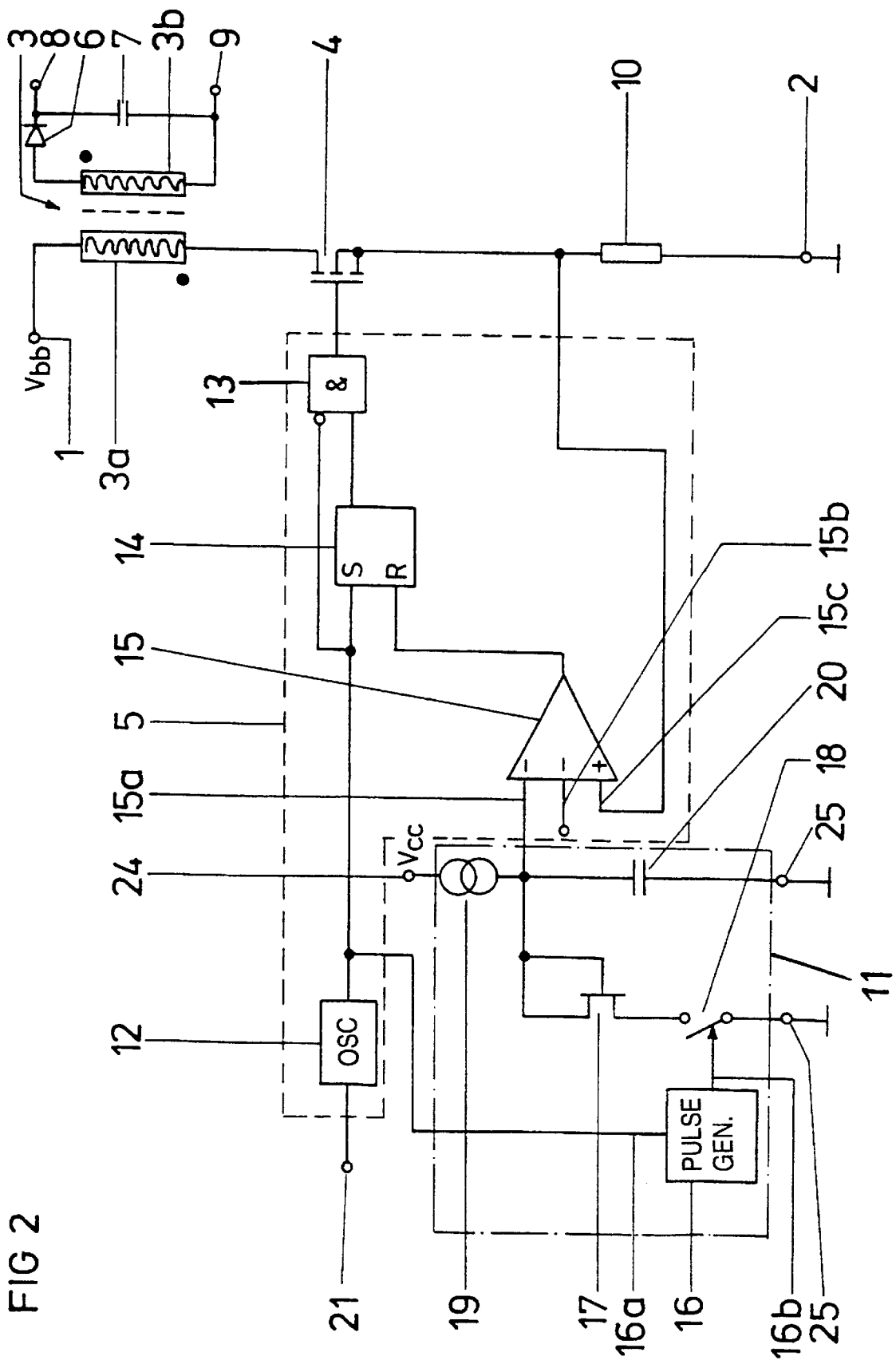
FIG. 2 is a circuit schematic of a first, basic exemplary embodiment of the circuit configuration according to the invention.

FIG. 2 shows a first exemplary embodiment of the circuit configuration according to the invention. In the present exemplary embodiment, control unit 5 is realized in more detail. An oscillator 12 is controlled with a clock signal via an input 21. At its output side, the oscillator 12 is connected to the set input of a flip-flop 14. A reset input R of the flip-flop 14 is connected to the output of a comparator 15. In addition, a logic element 13 is provided that is realized as an AND gate. A first input of the logic element 13 is connected to the output of the flip-flop 14. An additional input of the logic element 13 is connected to the output of the oscillator 12, whereby this signal is inverted. At the output side, the logic element 13 is connected to the control electrode of the semiconductor switch 4. The semiconductor switch 4 is a MOSFET in the present example.

A measurement system is provided between the MOSFET 4 and the second reference potential terminal 2, for the acquisition of the load current, e.g. in the form of a resistor 10. At the node point between semiconductor switch 4 and resistor 10, a voltage proportional to the load current can be picked off, which voltage is supplied to the non-inverting input 15c of comparator 15 of control unit 5. A signal corresponding to the voltage at the charge store 7 of the secondary side is available at a first inverting input 15b of the comparator 15. A further inverting input 15a of the comparator 15 is connected to a power regulation system 11.

One input of the power regulation system 11 is connected to the output of the oscillator 12. The power regulation system 11 has a pulse generator 16 that forms with its input 16a the input of the power regulation system 11. An output 16b of the pulse generator 16 controls a switch 18. The switch 18 can for example be realized as a MOSFET or as a bipolar transistor. In principle, any type of switch is conceivable.

In addition, the power regulation system has the series circuit of a current source 19 and a charge store 20.

The series circuit 19, 20 is connected between a third supply potential terminal 24 and a fourth reference potential terminal 25 to which ground potential is connected. The third supply potential terminal 24 carries an internal supply voltage $V_{cc}$, which is substantially smaller than first supply potential $V_{bb}$ in first supply potential terminal 1. The charge store 20 is realized as a capacitor, and is connected with reference potential terminal 25. The current source 19 is connected to the third supply potential terminal 24. The node point between the current source 19 and the charge store 20 is connected on the one hand to the additional inverting input 15a of the comparator 15, and thus forms the output of the power regulation system. On the other hand, it is connected to a terminal of the switch 18 via a transistor 17 that is wired to a MOS diode. The other terminal of the switch 18 is connected to the fourth reference potential terminal 25. The transistor 17, wired as a MOS diode, is connected with its drain and gate terminal to the node point of the current source 19 and the charge store 20. At the source side, the transistor 17 is connected with the switch 18.

Current source 19 is constructed in such a way that it supplies a constant current, independent of the voltage at third supply potential terminal 24. Current source 19 and charge storage unit 20 are, in many cases, contained in the control unit of a flyback converter switched-node power supply. There, they are used for what is known as a soft start. The soft start is used to cause the pulse width, or the primary peak current, produced by the pulse width modulator to increase with a ramp shape after the switching on of the switched-mode power supply. During the switching on of the switched-mode power supply, charge storage unit 20 is discharged. This storage unit is charged, with a ramp shape, via constant current source 19. Comparator 15 has two inverting inputs, of which the one having the respectively smaller voltage dominates. The pulse width, or the primary peak current, produced by control unit S increases with a ramp shape after the switching on of the switched-mode power supply, until the capacitor voltage exceeds the voltage value of the control signal at input 15b of comparator 15. From this time onward, control signal 15b determines the primary peak current, which is then determined by the voltage at first output terminal 8 of the secondary side.

The advantage of the inventive circuit configuration is therefore that power regulation system 11 makes do with only a few additional components in order to be able to carry out an extremely precise regulation of the output power.

In the present, first exemplary embodiment, which represents the basic variant of the inventive circuit configuration, pulse generator 16 can be operated with a fixed pulse duration. The pulse duration can thereby in principle be set arbitrarily. However, it must be ensured that the maximum pulse duration, i.e., the time in which switch 18 is closed, is smaller than the period duration at the highest frequency of oscillator 12. A fixed pulse duration is in particular possible when the switched-mode power supply is operated at ambient temperatures between 0 and 40° C. If the switched-mode power supply is used outside this temperature range, the power regulation can become less precise due to temperature influences on the MOS diode.

With the exception of charge storage unit 20, which is realized as an external capacitor, all components of power regulation system 11 can be realized in integrated form.

The functioning of the inventive circuit configuration is as follows. MOS transistor 17, connected to a diode, has a current-voltage characteristic curve having a quadratic shape. The voltage present at the MOS diode is consequently a square root function of the current flowing through it. The charge current in charge storage unit 20 can flow off via the MOS diode only during the time interval in which this diode is connected in parallel to charge storage unit 20. If the quantity of charge flowing off is too small, the voltage of charge storage unit 20 increases slowly over many periods. The charge quantity flowing off during each period increases in a manner corresponding to the quadratic characteristic of the MOS transistor, until the charge balance is equalized. From this time, the voltage at the node point between current source 19 and charge storage unit 20 does not increase further. The ratio of the height of the current pulses through the MOS diode to the constant current flowing in charge storage unit 20 is equal to the ratio of the period duration and the pulse width, given a steady state of the charge storage unit voltage. Thus, if the period duration of the oscillator signal at the output of oscillator 12 becomes larger, the height of the current pulses through the MOS diode increases to the same degree. At the same time, the voltage at charge storage unit 20 increases in a manner inversely proportional to the square root of the oscillator frequency.

In this way, it is ensured that at the highest line frequency a great deal more power is not emitted by the switched-mode power supply than is the case at the smallest possible line frequency of the switched-mode power supply. The inventive circuit configuration therefore prevents an unnecessary power loss at the secondary side.

Figure 3:
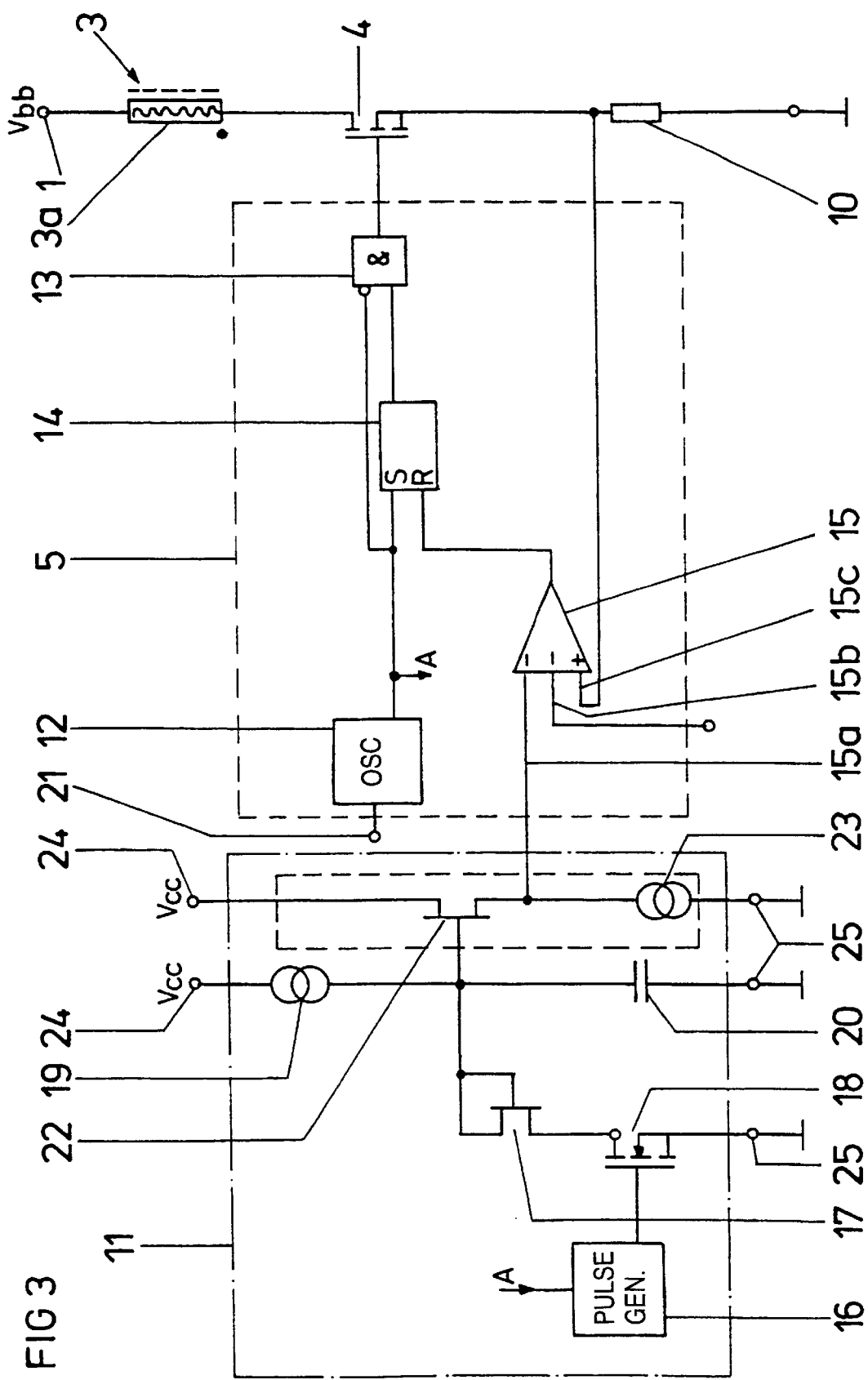
FIG. 3 is a similar view of a second exemplary embodiment of the novel circuit configuration.

FIG. 3 shows a second exemplary embodiment of the inventive circuit configuration. In comparison to the schematic circuit configuration shown in FIG. 2, the second exemplary embodiment additionally has components for the temperature compensation of the inception voltage of MOS diode 17. For this purpose, a series circuit of a MOS transistor 22 and a current source 23 is provided between third supply potential terminal 24 and fourth supply potential terminal 25. The node point of current source 19, with charge storage unit 20, is connected to the control terminal of MOS transistor 22. MOS transistor 22 is connected as a source follower between third supply potential terminal 24 and inverting input 15a of comparator 15. Current source 23, which can for example be realized as a resistor, is likewise connected to input 15a of comparator 15. With its other terminal, it is connected to reference potential terminal 25.

The voltage at which MOS diode 17 begins to conduct a current varies dependent on the ambient temperature. Through the temperature compensation by means of MOS transistor 22 and current source 23, a voltage signal is supplied to input 15a of comparator 15, in which the MOS inception voltage of MOS transistor 22 was subtracted from the voltage at charge storage unit 20. The quadratic current-voltage characteristic of MOS diode 17 is thus pushed, as it were, "to the origin" of the coordinate cross; i.e., the MOS diode already conducts a current whenever the voltage is only slightly different from zero.

Because not only the inception voltage of the MOS diode, but also the rise thereof, varies with a varying ambient temperature, this rise must also ideally be temperature-compensated. This temperature compensation takes place in the pulse generator, which then varies the pulse-duty ratio for switch 18 corresponding to the ambient temperature.

FIG. 3 shows an exemplary embodiment for a pulse generator that compensates the temperature dependency of the current-voltage characteristic curve of the MOS diode. The oscillator signal produced by the oscillator is fed to input 16a of pulse generator 16. Input 16a is connected on the one hand to the control input of a semiconductor switch 30 and is connected on the other hand to first input 26a of a logic element 26. Logic element 26 is realized as an AND gate. Semiconductor switch 30 is advantageously realized as a p– channel MOS transistor. The drain-source path of semiconductor switch 30 is connected in parallel to charge storage unit 29. Charge storage unit 29 is preferably a capacitor that can be monolithically integrated. The source terminal of semiconductor switch 30 is connected with third supply potential terminal 24, which carries a reference voltage Vcc. The non-inverting input of a comparator 27 on the one hand, as well as the drain terminal of an additional semiconductor switch 28, is connected with the drain terminal of semiconductor switch 30. The source terminal of additional semiconductor switch 28 is connected to fourth supply potential terminal 25. A first reference voltage $V_{REF1}$ is present at the inverting input of comparator 27, at a terminal 33. The first reference voltage has a lower value than supply potential terminal 24. The series circuit of a current source 31 and a semiconductor switch 32 that is connected to a MOS diode is provided between third supply potential terminal 24 and a second reference voltage, at a terminal 34. Current source 31, which can be realized as a resistor, is thereby connected with third supply potential terminal 24. The control terminal of MOS diode 32 is connected to the control terminal of additional semiconductor switch 28. Second reference voltage $V_{REF2}$ has a lower value than does first reference voltage $V_{REF1}$. Comparator 27 is connected at the output side with second input 26b of logic element 26. The output of logic element 26 forms output 16b of pulse generator 16, which controls switch 18 of power regulation system 11.

Figure 4:
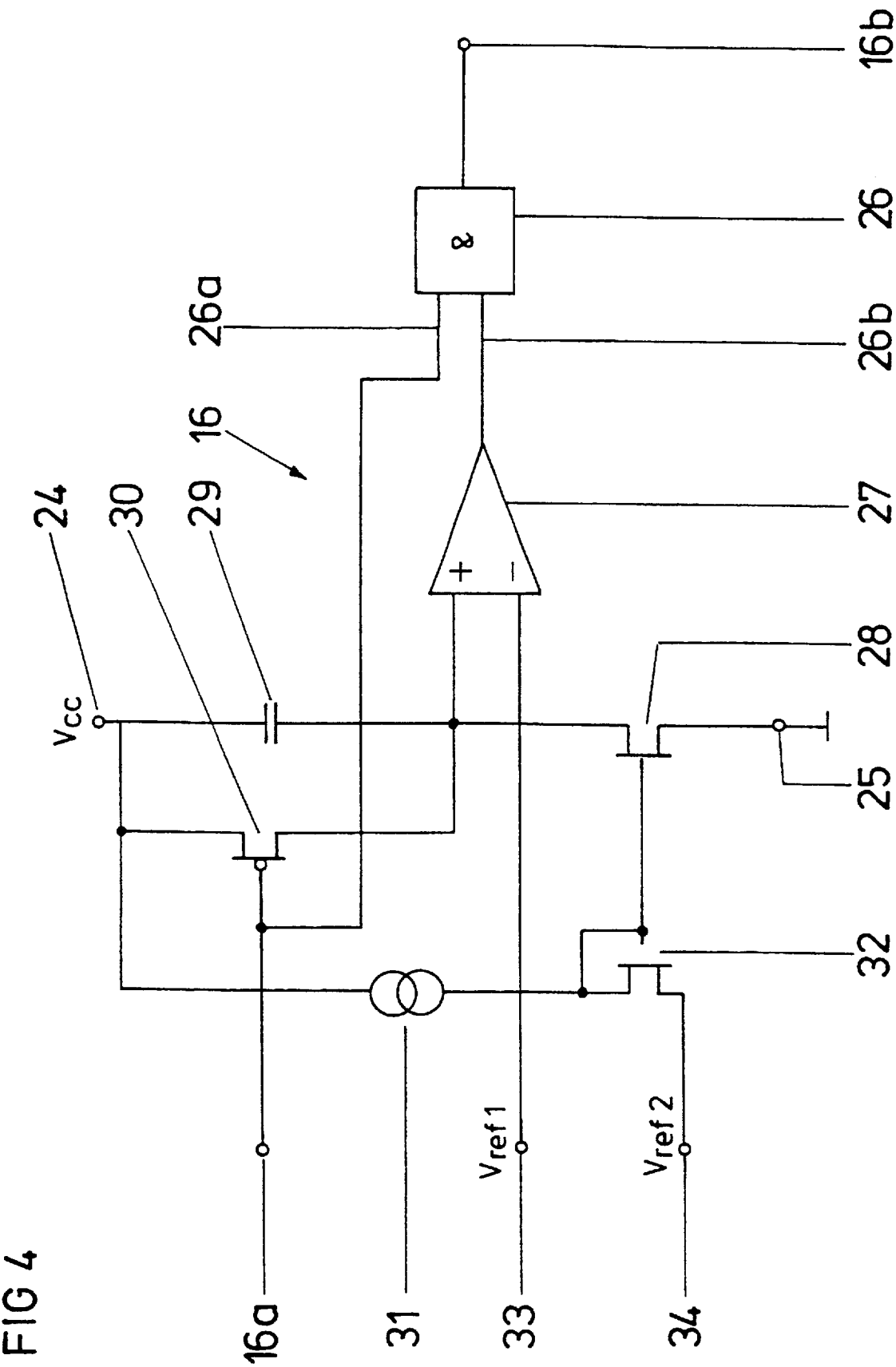
FIG. 4 is a diagram of a constructive example of the pulse generator that enables a temperature compensation of the characteristic of the MOS diode.

The functioning is as follows. As the temperature increases, the proportionality factor of the square root of the drain current divided by the gate voltage of MOS diode 17 decreases. Given increasing temperatures at the same oscillator frequency, this would therefore lead to a higher primary peak current. The pulse generator according to FIG. 4 produces a pulse width that is dependent on the proportionality factor, in that it operates temperature-dependent semiconductor switch 28 with predetermined reference voltage $V_{REF2}$ plus the MOS inception voltage of MOS diode 32. The drain current resulting from this voltage charges charge storage unit 29 up to first reference voltage $V_{REF1}$. If the drain current decreases in temperature-dependent fashion, the pulses emitted by pulse generator 16 become longer, so that the charge balance in charge storage unit 20 of the power regulation system does not change, even given varying ambient temperatures.

I claim:

1. A monolithically integratable control circuit for driving a semiconductor switch in a switched-mode power supply having a first and a second supply potential terminal, which comprises:

a control unit for generating control pulses for the semiconductor switch based on an oscillator signal having a variable oscillator frequency, wherein a duration of individual drive pulses depends on a first control signal that is dependent on an output voltage of the switched-mode power supply, and on a second control signal;

a measurement system connected to said control unit for generating the second control signal in dependence on a load current of the semiconductor switch;

a power regulation system connected to said control unit, said power regulation system receiving the oscillator signal, generating a third control signal inversely proportional to a square root of the oscillator frequency, and supplying the third control signal to said control unit.

2. The control circuit according to claim 1, wherein said power regulation system comprises:
- a pulse generator connected to receive the oscillator signal;
- a series circuit formed of a current source and a charge store connected between a third and a fourth supply potential terminal;
- a series circuit formed of a MOS diode and a controllable switch connected in parallel to said charge store; and
- wherein said controllable switch is driven based on said pulse generator and a duration of individual pulses is independent of the oscillator signal.

3. The control circuit according to claim 2, which comprises a node point between said current source, said charge store, and said MOS diode, said node point carrying the third control signal, and the third control signal is formed from a difference between an average voltage of said charge store and an inception voltage of said MOS diode.

4. The control circuit according to claim 1, wherein said control unit has a comparator with a first inverting input connected to receive the third control signal, a second inverting input connected to receive the first control signal, and a non-inverting input connected to receive the second control signal dependent on the load current of the semiconductor switch.

5. The control circuit according to claim 1, which comprises a node point between said current source, said charge store, and said MOS diode, and wherein said control unit has a comparator, said power regulation system includes a temperature compensation device configured to subtract a predetermined value from voltage at said node point to form a reduced voltage and to supply the reduced voltage to said comparator as a third control signal.

6. The control circuit according to claim 5, wherein said temperature compensation device has a semiconductor switch and a current source related to the fourth supply potential, and a node point between said semiconductor switch and said current source is connected to said comparator.

7. The control circuit according to claim 1, wherein said pulse generator includes means for compensating a temperature-dependent characteristic curve of said MOS diode of said power regulation system.

8. The control circuit according to claim 7, wherein said pulse generator has a charge store having an oscillator signal-controlled semiconductor switch connected in parallel, and wherein a temperature-dependent semiconductor switch is connected downstream of said charge store, and wherein a generated pulse duration is dependent on a duration required to charge said charge store from the third supply potential to a first reference potential.

* * * * *